US012348564B2

(12) United States Patent
Slusher et al.

(10) Patent No.: US 12,348,564 B2
(45) Date of Patent: Jul. 1, 2025

(54) SYSTEMS AND METHODS TO PERFORM PHISHING DETECTION AND DEVICE ATTESTATION VIA BROWSER EXTENSION

(71) Applicant: Obsidian Security, Inc., Newport Beach, CA (US)

(72) Inventors: Craig John Slusher, Havertown, PA (US); Marcus Roland McCurdy, Haddon Township, NJ (US); Joren B. McReynolds, Denver, CO (US)

(73) Assignee: Obsidian Security, Inc., Newport Beach, CA (US)

( * ) Notice: Subject to any disclaimer, the term of this patent is extended or adjusted under 35 U.S.C. 154(b) by 0 days.

(21) Appl. No.: 18/902,634

(22) Filed: Sep. 30, 2024

(65) Prior Publication Data

US 2025/0112955 A1 Apr. 3, 2025

Related U.S. Application Data

(60) Provisional application No. 63/586,907, filed on Sep. 29, 2023.

(51) Int. Cl.
*H04L 9/40* (2022.01)
(52) U.S. Cl.
CPC .................. *H04L 63/1483* (2013.01)
(58) Field of Classification Search
CPC .................................................. H04L 63/1483
See application file for complete search history.

(56) References Cited

U.S. PATENT DOCUMENTS

| | | | |
|---|---|---|---|
| 10,263,996 B1* | 4/2019 | Goodsitt | H04L 63/102 |
| 11,297,101 B1* | 4/2022 | Orhan | H04L 63/1483 |
| 11,595,437 B1* | 2/2023 | Mushtaq | H04L 63/20 |
| 11,924,241 B1* | 3/2024 | Lakshmanan | H04L 63/1416 |
| 2014/0173726 A1 | 6/2014 | Varenhorst | |
| 2016/0277443 A1* | 9/2016 | Anantharaju | H04W 12/128 |
| 2017/0078326 A1* | 3/2017 | Child | H04L 63/1483 |
| 2017/0230418 A1* | 8/2017 | Amar | H04L 67/01 |
| 2019/0132356 A1 | 5/2019 | Vargas Gonzalez | |

(Continued)

FOREIGN PATENT DOCUMENTS

| | | | |
|---|---|---|---|
| EP | 3820113 A1 | 5/2021 | |
| EP | 4097944 B1 | 8/2023 | |

OTHER PUBLICATIONS

International Search Report and Written Opinion for PCT Application No. PCT/US2024/049235 mailed Dec. 3, 2024, 20 pages.

(Continued)

*Primary Examiner* — Khang Do
(74) *Attorney, Agent, or Firm* — COOLEY LLP

(57) ABSTRACT

In an embodiment, a browser extension for a browser is installed at the first compute device. A first log indicating activities tracked by the browser extension as being performed at a software as a service (SaaS) application via the browser and by the user is generated. A representation of the first log is sent to a second compute device to cause the second compute device to perform cyber attestation by comparing (1) the first log and (2) a second log (a) sent to the second compute device via a third compute device associated with the SaaS application and (b) representing activities determined by the third compute device as being performed at the SaaS application via the browser and by the user.

20 Claims, 4 Drawing Sheets

(56) References Cited

U.S. PATENT DOCUMENTS

| | | | |
|---|---|---|---|
| 2020/0036751 A1* | 1/2020 | Kohavi | H04L 63/1416 |
| 2020/0322423 A1* | 10/2020 | Sheth | H04L 61/4511 |
| 2021/0021638 A1 | 1/2021 | Lancioni et al. | |
| 2021/0099485 A1 | 4/2021 | Lancioni et al. | |
| 2022/0070216 A1* | 3/2022 | Kohavi | H04L 63/1416 |
| 2022/0131883 A1 | 4/2022 | Wolff et al. | |
| 2022/0207121 A1* | 6/2022 | Singh | H04L 63/1483 |
| 2022/0210187 A1* | 6/2022 | Wing | H04L 51/212 |
| 2022/0232015 A1* | 7/2022 | Kumar | H04L 63/1425 |
| 2022/0337625 A1* | 10/2022 | Singh | G06N 3/04 |
| 2023/0231884 A1* | 7/2023 | Deshmukh | H04L 63/1441 |
| | | | 726/1 |
| 2023/0353596 A1* | 11/2023 | Singh | H04L 63/0838 |
| 2024/0406211 A1* | 12/2024 | Block | H04L 63/205 |

OTHER PUBLICATIONS

"Native Messaging", Mdn web docs, Page was modified on Sep. 10, 2024 by MDN contributors, 16 pages.
"User-Agent Header", Wikipedia, Printed on Oct. 14, 2024, 5 pages.
"What is a Browser Extension?", by How-To-Geek, Mar. 27, 2021, 11 pages.

* cited by examiner

300

Install a browser extension for a browser at the apparatus 302

Store a private key of a keypair 304

In response to a request to a software as a service (SaaS) application (1) cause, via the browser extension, an identifier that uniquely identifies the apparatus to be hashed using the private key to generate a hashed identifier, and (2) send the hashed identifier to a compute device to cause the compute device to use a public key of the keypair to obtain the identifier and determine whether the SaaS application is a phishing site and/or a suspected phishing site based on the identifier 306

Install a browser extension for a browser at a first compute device 402

Generate a first log indicating activities tracked by the browser extension as being performed at a software as a service (SaaS) application via the browser and by the user 404

Send a representation of the first log to a second compute device to cause the second compute device to perform cyber attestation by comparing (1) the first log and (2) a second log (a) sent to the second compute device via a third compute device associated with the SaaS application and (b) representing activities determined by the third compute device as being performed at the SaaS application via the browser and by the user 406

FIG. 4

SYSTEMS AND METHODS TO PERFORM PHISHING DETECTION AND DEVICE ATTESTATION VIA BROWSER EXTENSION

CROSS REFERENCE TO RELATED APPLICATIONS

This application claims priority to U.S. Patent Application No. 63/586,907, filed Sep. 29, 2023 and titled "SYSTEMS AND METHODS TO PERFORM PHISHING DETECTION AND DEVICE ATTESTATION VIA BROWSER EXTENSION," the contents of which are incorporated herein in its entirety.

FIELD

One or more embodiments are related to systems and methods to perform phishing detection and device attestation via a browser extension.

BACKGROUND

It can be desirable to analyze the actual content (e.g., hypertext markup language (HTML)/document object model (DOM)) of all websites visited by a user, not just software as a service (SaaS) applications. Known techniques do not do this, however, because transport layer security (TLS)/secure sockets layer (SSL) man-in-the-middle (MITM) attack could be performed, which can be undesirable (e.g., from a privacy perspective). Accordingly, it can be desirable to analyze the actual content of all websites visited by a user without performing man-in-the-middle analysis.

SUMMARY

In an embodiment, a browser extension for a browser is installed at a first compute device associated with a user. The browser extension is associated with an identifier that uniquely identifies a combination of the browser and at least one of the first compute device or the user. For each site visited via the browser, the site is analyzed via the browser extension to determine whether the site is a phishing site and/or suspected phishing site. For each request to a software as a service (SaaS) application at a second compute device via the browser, a user-agent header associated with that request is updated to include the identifier. The user-agent header is sent to the second compute device to cause a third compute device to (1) receive the identifier from the second compute device, (2) receive an audit log indicating a set of activities performed at the SaaS application, and (3) identify a subset of activities that is from the set of activities and that is performed via the browser using the identifier.

In an embodiment, a browser extension for a browser is installed at the first compute device. A first log indicating activities tracked by the browser extension as being performed at a software as a service (SaaS) application via the browser and by the user is generated. A representation of the first log is sent to a second compute device to cause the second compute device to perform cyber attestation by comparing (1) the first log and (2) a second log (a) sent to the second compute device via a third compute device associated with the SaaS application and (b) representing activities determined by the third compute device as being performed at the SaaS application via the browser and by the user.

BRIEF DESCRIPTION OF THE DRAWINGS

FIG. 3 shows a flowchart of a method to perform attestation, according to an embodiment.

FIG. 4 shows a flowchart of a method to perform attestation, according to an embodiment.

DETAILED DESCRIPTION

Some implementations are related to a browser extension for a browser, such as Google Chrome®, Microsoft Edge®, Mozilla Firefox®, Safari®, and/or the like. A user can install the browser extension for a browser of the user's compute device. The browser extension can be associated with an identifier that is unique to that (1) user and/or user's compute device and (2) browser. Said differently, each browser used by each user and/or user compute device having the browser extension can be associated with an identifier that is different from remaining browsers and remaining users and/or user compute devices. For example, the browser extension installed in Bob's Chrome® browser, Bob's Edge® browser, and Joe's Chrome® browser will each be associated with a unique/different identifier. As another example, the browser extension installed in a first compute device's Chrome® browser, a second compute device's Edge® browser, and a third compute devices Chrome® browser will each be associated with a unique/different identifier.

In some implementations, the browser extension is used to perform phishing detection. The browser extension can analyze the content (e.g., HTML/DOM) on sites visited in the browser of the browser extension, including sub-resource requests made. For example, if a user uses the browser to visit a first site and an ajax/xhr request is made to a second site, both sites can be inspected via the browser extension. Known phishing detection techniques don't analyze sites because transport layer security (TLS)/secure sockets layer (SSL) man-in-the-middle (MITM) attack could be performed, which can be undesirable in some circumstances. But because the browser extension is in the browser for techniques described herein, encrypted data sent between endpoints over a network is not decrypted and all request and response data can be monitored. In some implementations, a "suspected phishing site" refers to a site predicted to be a phishing site without certain proof, whether or not the suspected phishing site is actually a phishing site. In some implementations, a "phishing site" refers to an actual phishing site.

Additionally or alternatively, in some implementations, the browser extension is used to perform attestation. Attestation can provide assurance that the properties of a device (e.g., the serial number) and/or activities performed by the device are legitimate (e.g., as attested to by the device's Secure Enclave or Trusted Platform Module) and not spoofed.

Figure 1:
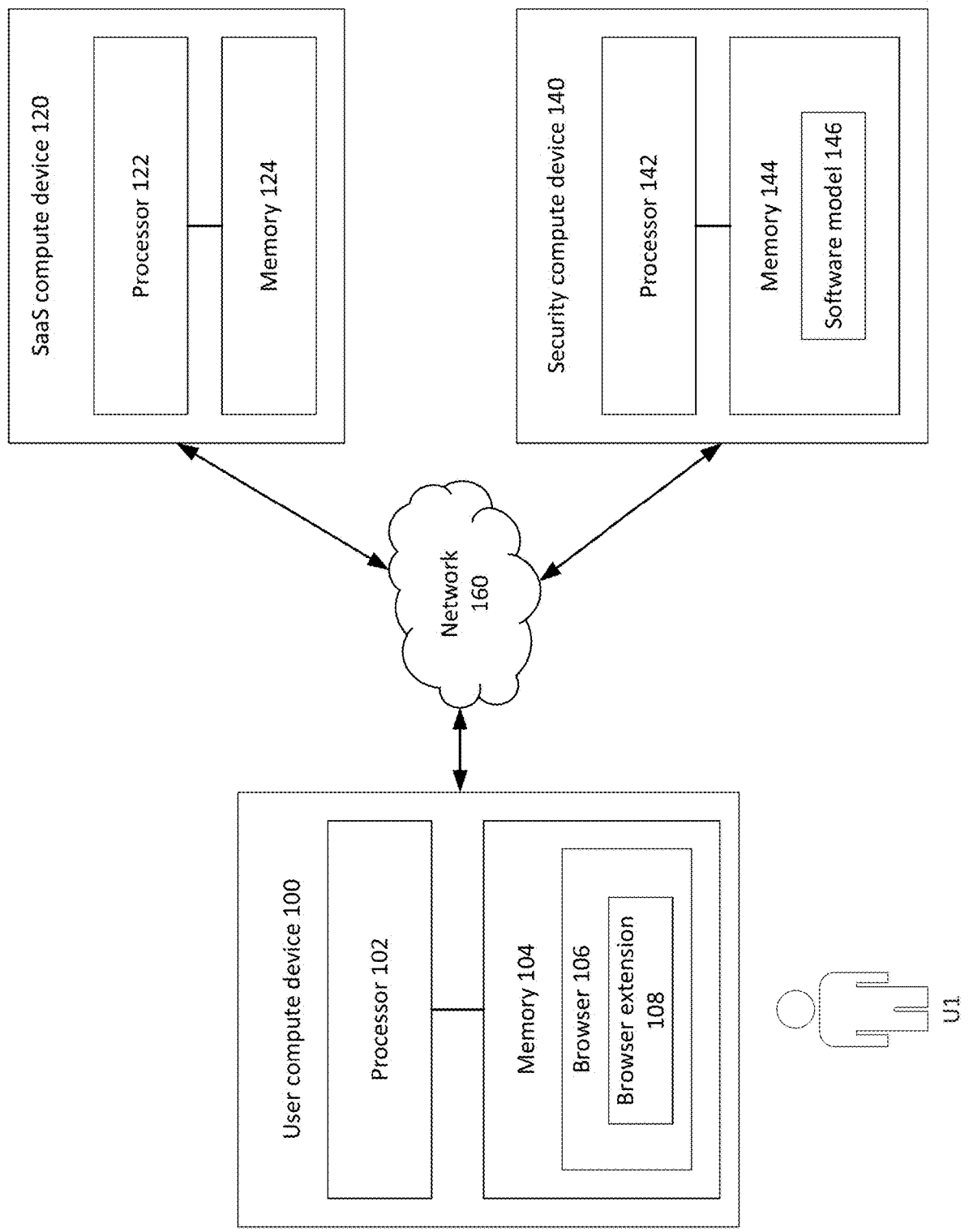
FIG. 1 shows a system block diagram for performing phishing detection and attestation, according to an embodiment.

FIG. 1 shows a system block diagram for performing phishing detection and attestation, according to an embodiment. FIG. 1 includes user compute device 100, SaaS compute device 120, and security compute device 140, each communicatively coupled to one another via network 160.

Network 160 can be any suitable communications network for transferring data, for example operating over public and/or private communications networks. For example, network 160 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 160 can be a wireless network such as, for example, a Wi-Fi® or wireless local area network ("WLAN"), a wireless wide area network ("WWAN"), and/or a cellular network. In other instances, the network 160 can be a wired network such as, for example, an Ethernet network, a digital subscription line ("DSL") network, a broadband network, and/or a fiber-optic network. In some instances, network 160 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via network 160 can be encrypted or unencrypted. In some instances, the network 160 can include multiple networks or subnetworks operatively coupled to one another by, for example, network bridges, routers, switches, gateways and/or the like.

User compute device 100 includes processor 102 communicatively coupled to memory 104 (e.g., via a system bus). User compute device 100 can be any type of compute device, such as a desktop, laptop, tablet, phone, smart device, and/or the like. User compute device 100 can be associated with (e.g., owned by, accessible by, authorized to be used by, has an account in the name of, etc.) user U1. User U1 can any type of user, such as an employee or student.

Browser 106 can be installed at user compute device 100. Browser 106 can be a program with a graphical user interface for displaying and navigating between sites. Browser 106 can be any type of web browser, such as Google Chrome®, Microsoft Edge®, Mozilla Firefox®, or Safari®. Additionally, browser extension 108 can be a browser extension for browser 106. The term "browser extension" can include plug-ins. Browser extension 108 can be associated with an identifier that is unique to browser 106 and at least one of user U1 or user compute device 100. The identifier may be generated and/or assigned (e.g., by user compute device 100 and/or security compute device 140) when and/or after browser extension 108 has been installed for browser 106.

Where a browser extension is associated with an identifier that is uniquely associated with browser 106 and user U1, browser extensions for different users (e.g., part of the same or different entity or organization) can be associated with different identifiers. For example, each member of a family may access Google Chrome® at user compute device 100 using a different account/profile; in such a case, the browser extension that one member of the family used to access browser 106 can be associated with an identifier different than the identifier for a browser extension that a different member of the family used to access browser 106.

Where browser extension 108 is associated with an identifier that is uniquely associated with browser 106 and user compute device 100, browser extensions for different compute devices can be associated with a different identifier. For example, even though each member of a family accesses Google Chrome® at user compute device 100 using a different account/profile, the browser extension and identifier are common for each member of the family (for Google Chrome®). Said differently, no matter how many different users/user accounts use a browser of a single compute device, the identifier and browser extension for that browser and single compute device is the same.

In some implementations, a "user profile" refers to a collection of settings and information associated with a user. The user profile can include information that is used to identify an individual, such as their name, age, photograph, preferred setting, and/or the like. In some implementations, a user profile does not exist until a user creates the user profile though a user profile set up process, such as providing a name, username, password, date of birth, biometric, and/or the like. In some implementations, after being setup, a user profile can be accessed using a login process, such as providing a name and password, single sign on (SSO), biometric authentication, and/or the like.

SaaS compute device 120 includes processor 122 operatively coupled to memory 124 (e.g., via a system bus). SaaS compute device 120 can be any type of compute device, such as a server, desktop, laptop, tablet, phone, smart device, and/or the like. SaaS compute device 120 can facilitate/host a SaaS application accessible by user U1 via user compute device 100. SaaS compute device 120 can track and log activities (e.g., download files, send emails, etc.) and associated details (e.g., user, IP address, time, etc.) that occur at the SaaS application. For example, SaaS compute device 120 can track that user U1 downloaded a particular file at a particular time via browser 106. In some implementations, user compute device 100, SaaS compute device 120, and security compute device 140 are each operated and/or controlled by a separate entity. For example, user compute device 100 can be operated and/or controlled by a first entity, SaaS compute device 120 can be operated and/or controlled by a second entity, and security compute device 140 can be operated and/or controlled by the third entity. In another example, user compute device 100 is operated and/or controlled by an entity and SaaS compute device 120 and security compute device 140 are operated and/or controlled by a different entity.

Security compute device 140 includes processor 142 operatively coupled to memory 144 (e.g., via a system bus). Security compute device 140 can be any type of compute device, such as a server, desktop, laptop, tablet, phone, smart device, and/or the like. Security compute device 140 can facilitate phishing detection and/or attestation of user compute device 100.

Software model 146 can be included (e.g., stored) in memory 144 of security compute device 140. Software model 146 can be any type of software model, such as for example, an artificial intelligence (AI) model, machine learning (ML) model, analytical model, mathematical model, and/or the like. As will be discussed herein, software model 146 can be used to perform various tasks at security compute device 140, such phishing detection, receiving/retrieving audit logs from SaaS compute device 120, defining public and private keys, and/or the like.

Processors 102, 122, 142 can be, for example, a hardware-based integrated circuit (IC) or any other suitable processing device configured to run and/or execute a set of instructions or code. For example, processors 102, 122, 142 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processors 102, 122, 142 can be configured to run any of the methods and/or portions of methods discussed herein.

Memories 104, 124, 144 can be, for example, a random-access memory (RAM), a memory buffer, a hard drive, a read-only memory (ROM), an erasable programmable read-only memory (EPROM), and/or the like. Memories 104, 124, 144 can be configured to store any data used by processors 102, 122, 142 (respectively) to perform the techniques (methods, processes, etc.) discussed herein. In some instances, memories 104, 124, 144 can store, for example, one or more software programs and/or code that can include instructions to cause the processors 102, 122, 142 (respectively) to perform one or more processes, functions, and/or the like. In some implementations, memories 104, 124, 144 can include extendible storage units that can be added and used incrementally. In some implementations, memories 104, 124, 144 can be portable memories (for example, a flash drive, a portable hard disk, a SD card, and/or the like) that can be operatively coupled to processors 102, 122, 142, respectively. In some instances, memories 104, 124, 144 can be remotely operatively coupled with a compute device (not shown in FIG. 1).

As previously noted, in some implementations, browser extension 108 can be associated with an identifier that is unique to browser 106 and user U1. Thus, user U1 can be determined based on, for example, a username associated with user U1, an email associated with user U1, a pin number associated with user U1, and/or the like. User U1 can be determined before generating the identifier and/or associating the identifier to browser extension 108. In some implementations, user compute device 100 can determine user U1 by checking browser 106 for who the user is in the event the user is signed into browser 106. For example, user U1 may have signed into browser 106 with their Google account, and user compute device 100 can use the command "chrome.identity.getProfileUserInfo.API" to determine user U1's username or email address. In some implementations, when user compute device 100 visits a SaaS application's site, the local storage, session storage, cookies, and/or the like can be analyzed to determine user U1's identity, such as finding an email address or username of user U1. In some implementations, the browser history of browser 106 can be analyzed to determine user U1's identity. For example, if user U1 is visiting their Gmail® page via browser 106 and was logged in, the title of the page shown in the browser history can include user U1's Gmail® email address. In some implementations, browser extension 108 can request input from user U1 before and/or after install, such as requesting user U1 input their email address, name, employee identification number, and/or the like. If user U1's identity cannot be determined, any of the aforementioned techniques can be repeated (e.g., periodically, sporadically, etc.) until user U1's identity has been determined.

Also as previously noted, in some implementations, browser extension 108 can be associated with an identifier that is unique to browser 106 and user compute device 100. For example, in some implementations, the identifier can be generated based on a unique identifier of user compute device 100 like a media access control (MAC) address, central processing unit (CPU) serial number, hard drive disk (HDD) serial number, and/or the like. As another example, browser 106 can be determined by analyzing a user-agent string sent with a HTTP request, using a function to detect browser 106 (e.g., detectBrowser( )), analyzing browser 106 for attributes of known browsers (e.g., analyze the user interface, identify logos, etc.), and/or the like.

Browser extension 108 can also be used for phishing detection. Browser extension 108 can analyze the content (e.g., HTML/DOM) on sites visited/requested by browser 106 to detect phishing. Suspected phishing sites and/or phishing sites can be detected using one or more techniques discussed herein, for example, based on reputation (e.g., Google® Safe Browsing, network security firewalls, etc.).

In some implementations, phishing site detection is content signature based. Browser extension 108 can analyze a given site visited by browser 106 for a predetermined element(s) (e.g., predefined data of the site; a code portion of the site; a feature of the site) that should only exist at a limited set of sites. If the predetermined elements are identified at the site but the site domain is not included in the limited set of sites, user compute device 100 can determine that the site is a suspected phishing site and/or phishing site. For example, it may be known that Microsoft's login page has an input box of "Email, phone, or Skype" that should not exist at sites other than the domains of microsoft.com and microsoftonline.com. Thus, if browser extension 108 determines that a site visited by browser 106 includes an input box with "Email, phone, or Skype," but the domain is not microsoft.com or microsoftonline.com, the site can be flagged as a phishing site and/or suspected phishing site.

In some implementations, phishing site detection is image comparison based. Memory 104 can include (e.g., store) images of known elements (e.g., a code portion/feature/predefined data of a site) that should only exist at a limited set of sites (e.g., image A should only exist at website X, image B should only exist as website Y, image C should only exist as websites Y and Z, etc.). For example, memory 104 can include (e.g., store) images of login pages for common SaaS applications. When user U1 is browsing using browser 106, each site can be analyzed to determine if the known element is included in that site; if the known element is included in that site but that site's domain does not match with the predetermined reference domain(s) associated with that known element, that site can be flagged as a phishing site and/or suspected phishing site. For example, if browser 106 is at a site with an image(s) that resembles an image(s) of a Gmail® login screen but browser extension 108 identifies that the domain of that site is not google.com, that site can be flagged as a phishing site or suspected phishing.

In some implementations, phishing site detection is page/resource hashing based. Using a hashing function (e.g., fuzzy and/or non-fuzzy), hashes for an HTML element (e.g., HTML document segment/section/portion) at a site, a document object model (DOM) at the site, and/or a resource loaded on the site are computed. If the hash matches with a hash for an HTML element (e.g., HTML document segment/section/portion), DOM, and/or resource from a site previously identified as risky (e.g., blacklisted), the site is flagged as a phishing site and/or suspected phishing site. If the hash matches with a reference hash for an HTML element, DOM, and/or resource from a site previously identified as trusted (e.g., whitelisted), but the domain of the site used to generate the hash is different than the domain of the site used to generate the reference hash (i.e., the actual domain does not match the expected domain), the site is flagged as a phishing site and/or suspected phishing site.

In response to a site being identified as a phishing site and/or suspected phishing site, a remedial action can occur. For example, user compute device 100 can cause browser 106 to leave the site (note that this phishing site and/or suspected phishing site can be stored at a compute device coupled to network 160 but is not user compute device 100, SaaS compute device 120, or security compute device 140)

(e.g., redirect to a different site, close browser 106, turn off user compute device 100, and/or the like) automatically and without human intervention. As another example, an electronic signal can be sent to SaaS compute device 120 and/or security compute device 140 identifying the site, altering that user U1 visited the site, and/or the like. As another example, the site can be added to a blacklist (e.g., at user compute device 100 and/or security compute device 140) so that user compute device 100 and/or other compute devices (e.g., that are part of the same organization) are prevented from visiting the site. As another example, a mode of operation of user compute device 100 can change, such as running an antivirus application. As another example, user U1 can be assigned to perform cybersecurity training.

Browser extension 108 can also be used for device attestation. In some implementations, when user compute device 100 navigates to an enterprise SaaS application (e.g., Salesforce®, Zendesk®, etc.) or visits a site that makes an xhr/ajax request to one of these applications, the user-agent header is modified to include the identifier and/or an encrypted version of the identifier associated with browser extension 108. If the identifier is encrypted, the identifier may be encrypted using a public key of a keypair by user compute device 100, while the private key of the keypair can be stored at security compute device 140.

In one example, if user compute device 100 accesses a site hosted by SaaS compute device 120 using browser 106, a user-agent header that includes an encrypted version of the identifier (along with other information that might be included in a user-agent header such as application, operating system vendor, version of request user agent, etc.) is sent to SaaS compute device 120. For example, if the encrypted version of the identifier associated with browser extension 108 is "Obsidian/1.2 (vpLfZn/UyIbdsWOg25EgSg+ 1B2X5edsgsOLbKU9S8rZKmxdpguJlhci2EGgdu3 6Q),"

user compute device 100 can send user-agent header

"Mozilla/5.0 (Macintosh; Intel Mac OS X 10_15_7) AppleWebKit/537.36 (KHTML, like Gecko) Chrome/ 114.0.0.0 Safari/537.36 Obsidian/1.2 (vpLfZn/ UyIbdsWOg25EgSg+ 1B2X5edsgsOLbKU9S8rZKmxdpguJlhci2EGgdu 36Q)"

to SaaS compute device 120.

Thereafter, software model 146 of security compute device 140 can retrieve/receive audit logs from SaaS compute device 120 via an application programming interface (API). The audit logs can include information like user, IP addresses, and/or the like. The audit logs can also include user-agent headers sent from one or more user devices (e.g., user compute device 100) to access SaaS compute device 120. Software model 146 can search for the user-agent headers and determine if the audit logs include the identifiers and/or encrypted versions of the identifiers. If the encrypted versions of the identifiers are identified, the encrypted versions of the identifiers are decrypted by software model 146 using the private key to obtain the identifiers and enrich the audits logs. Enriching the audit logs can include, for example, adding new information and/or a notation to the audit log like noting a given log entry might relate to an audit discrepancy. Because the audit logs and user-agent header can include indication of the user and browser for a given activity at SaaS compute device, software model 146 can determine the identifier associated with that user or user compute device and browser (e.g., using a look up table) and whether the determined identifier matches the decrypted identifier. If both identifiers match, software model 146 and security compute device 140 can attest that the activity in the audit log really came from browser 106 and not some other user and/or browser. If the identifiers do not match, however, security compute device 140 cannot attest that the activity in the audit log actually came from browser 106 and not some other user and/or browser. Additional details related to receiving data about users and activities at SaaS applications, such as audit logs from SaaS compute devices by software model 146, are discussed in U.S. patent application Ser. No. 17/430,577 filed Aug. 12, 2021, the contents of which are incorporated by reference herein in its entirety.

In some implementations, performing device attestation can include at software model 146 defining a private key and a public key. The private key can be sent from security compute device 140 to user compute device 100, and stored in a dedicated special hardware device (e.g., Trusted Platform Module (TPM) or Secure Enclave). When browser 106 accesses a SaaS application hosted by SaaS compute device 120, browser extension 108 sends a message (e.g., via native messaging) to some locally stored code (e.g., resident binary) to hash an identifier (e.g., user compute device 100 serial number) using the private key stored in the dedicated special hardware device, then sends the hashed identifier to security compute device 140. Software model 146 then uses the public key to reverse the hash function and obtain the identifier of user compute device 100. If the identifier matches what is expected, user compute device 100 is successfully attested (and the SaaS application is not a phishing site and/or suspected phishing site); if the identifier does not match what is expected, user compute device 100 is not successfully attested (and SaaS application is a phishing site and/or suspected phishing site).

In some implementations, performing device attestation includes user compute device 100 using browser extension 108 to track all activities performed at SaaS compute device 120 using browser 106. Additionally, SaaS compute device 120 can track all activities occurring at SaaS compute device 120 that are from browser 106 (e.g., as discussed in U.S. patent application Ser. No. 17/430,577; without using a browser extension). Thus, both user compute device 100 and SaaS compute device 120 track activities performed at the SaaS application hosted by SaaS compute device 120. Thereafter, indications of the activities tracked by each of user compute device 100 and SaaS compute device 120 are sent to/received at security compute device 140 to determine (e.g., by software model 146) if both sets of activities match. If both sets of activities match or substantially match (e.g., at least 90% similar, at least 99% similar, and/or the like), user compute device 100 is successfully attested (and the SaaS application is not a phishing site and/or suspected phishing site); if both sets of activities do not match or do not substantially match, user compute device 100 is not successfully attested (and SaaS application is a phishing site and/or suspected phishing site).

To provide an example, browser extension 108 can determine that user compute device 100 used SaaS compute device 120 to downloaded certain files and send a log indicating so to security compute device 140. Using software model 146, security compute device 140 can also receive a log from SaaS compute device 120 indicating activities performed at SaaS compute device 120 by browser 106. If, for example, the activities were downloading the same files but also sending email not tracked by browser extension 108, software model 146 can determine that phishing has (or has likely) occurred and not attest user compute device 100.

In some implementations, browser extension 108 can be deployed using other, existing deployment tools operating at user compute device 100, like Microsoft® System Center Configuration Manager (SCCM), Jamf, Kandji, GPO, and/or the like.

In some implementations, although FIG. 1 shows a single browser (browser 106) and single browser extension (browser extension 108) at user compute device 100, in other implementations, any number of browsers and browser extensions can operate at user compute device 100.

In some implementations, although FIG. 1 shows a single user compute device (100), single SaaS compute device 120, and single security compute device (140), in other implementations, any number of user compute devices, SaaS compute devices, and security compute devices can be used to perform device attestation and phishing detection for any number of users and SaaS applications.

In some implementations, from the perspective of security compute device 140, a representation of the identifier and the associated browser 106 and user U1 and/or user compute device 100 is received (e.g., from user compute device 100). In some implementations, security compute device 140 has access to and can update, for example, a look up table that tracks the identifier associated with a given browser and user and/or user compute device. Additionally, audit logs are received/retrieved from SaaS compute device 120 (e.g., using an API). For each entry in the audit log, the audit logs can include indication of the browser and user and/or user compute device used to perform that entry; for that entry, the browser and user and/or user compute device indication included in the audit log can be used to determine what the identifier associated with the browser extension of that browser and user and/or user compute device should be (e.g., referring the look up table). For each entry, the audit logs can also include representation of the user-agent header sent from user compute device 100 to SaaS compute device 120, where the user-agent header can include the identifier (e.g., inserted into the user-agent header by user compute device 100). The identifier can be in encrypted or decrypted form. If in decrypted form, the identifier retrieved from the user-agent header in the audit log is compared to the identifier determined for that browser and user/user compute device to determine if there is a match; a device is attested if there is a match, and a device is not attested if there is not a match. If the identifier in the user-agent header is encrypted (e.g., by user compute device 100 using a public key associated with a private key), security compute device 140 can have and use the private key to decrypt the identifier. Thus, in a way, security compute device 140 performs device attestation by determining what the identifier for a given browser and user and/or user compute device combination should be, and determining if an entry in the audit log associated with that same browser and user and/or user compute device includes the expected identifier.

In some implementations, from the perspective of security compute device 140, a private key and public key are defined at security compute device 140. Security compute device 140 can send the private key to user compute device 100. Security compute device 140 can also receive (e.g., from user compute device 100) indication of an identifier identifying user compute device 100 (e.g., from user compute device 100), such as a serial number unique to user compute device 100. During device attestation, user compute device 100 can hash the same identifier using the private key, and send the hashed identifier to security compute device 140. Security compute device 140 can use the public key to reverse the hash function and obtain the identifier. The identifier obtained via reverse hash and the non-hashed identifier can then be compared, where user compute device 100 is attested if there is a match and user compute device 100 is not attested if there is not a match.

In some implementations, from the perspective of security compute device 140, an indication of activities performed at a SaaS application run on SaaS compute device 120 using browser 106 and as tracked by user compute device 100 (e.g., using browser extension 108) are received from user compute device 100. Additionally, an indication of activities performed at the same SaaS application using browser 106 as tracked by SaaS compute device 120 are received from SaaS compute device 120. Thereafter, security compute device 140 can compare both sets of indications of activities, where user compute device 100 is attested if there is a match and user compute device 100 is not attested if there is not a match. For example, if browser extension 108 tracks that user U1 performed only a first activity at a SaaS application but SaaS compute device 120 determines that a second activity attributed to user U1/user compute device 100/browser 106 was performed at the SaaS application, user compute device 100 is not attested.

Figure 2:
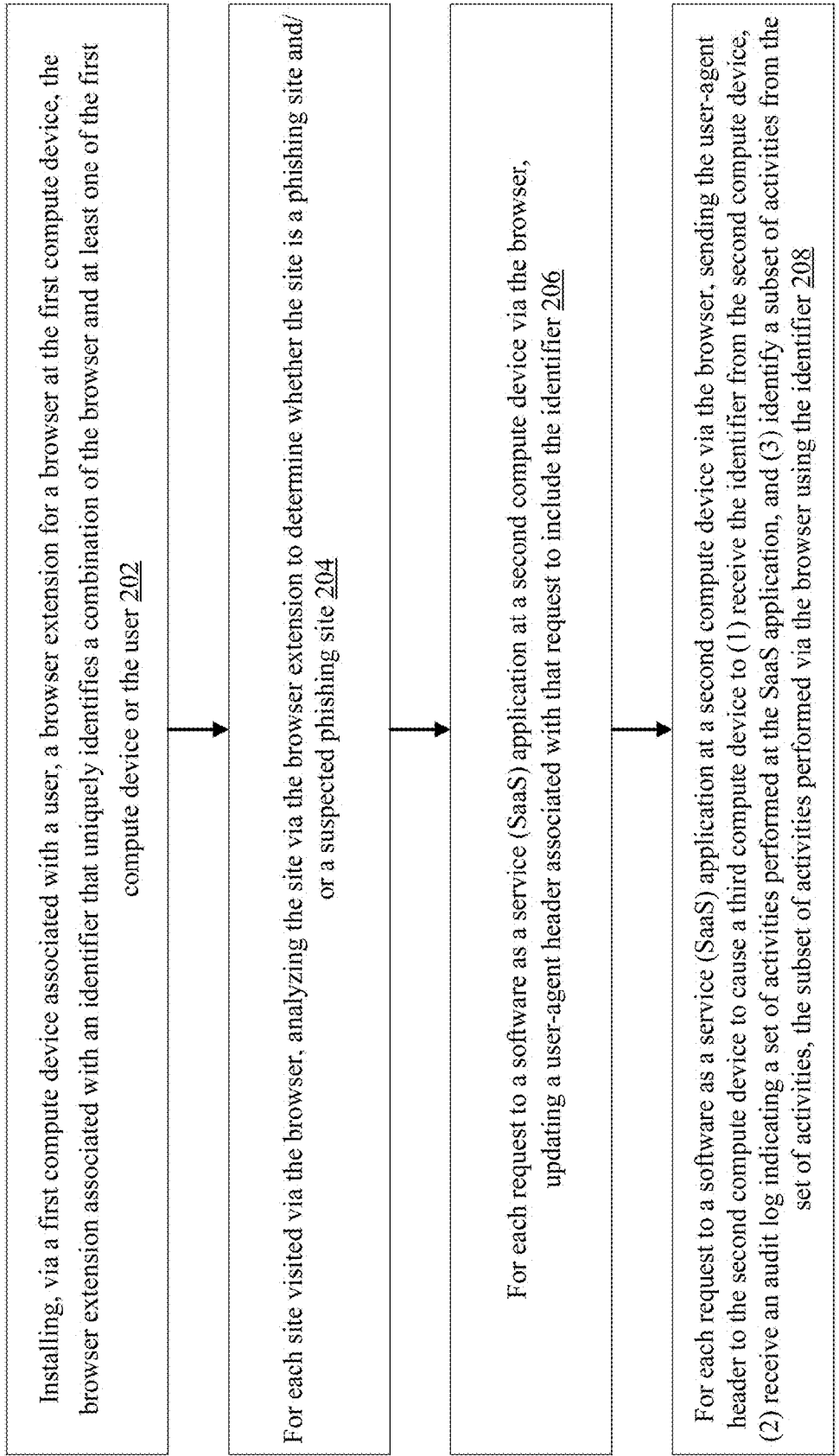
FIG. 2 shows a flowchart of a method to identify phishing sites and/or suspected phishing sites and perform attestation, according to an embodiment.

FIGS. 2, 3, and 4 are each related to using a browser extension to perform cybersecurity risk mitigation. The methods discussed with respect to FIGS. 2, 3, and 4 can each be performed by a user compute device, such as user compute device 100, for phishing detection and/or device attestation.

FIG. 2 shows a flowchart of a method 200 to identify phishing sites and/or suspected phishing sites and perform attestation, according to an embodiment. In some implementations, method 200 is performed by a processor (e.g., processor 102).

At 202, a browser extension (e.g., browser extension 108) for a browser (e.g., browser 106) is installed at a first compute device (e.g., user compute device 100) associated with a user (e.g., user U1). The browser extension is associated with an identifier that uniquely identifies a combination of the browser and at least one of the first compute device or the user. In some implementations, the browser extension is installed at the first compute device and not other devices (e.g., not installed at SaaS compute device 120, not installed at security compute device 140, not installed at a compute device not shown in FIG. 1, and/or the like). At 204, for each site visited via the browser, the site is analyzed via the browser extension to determine whether the site is a phishing site and/or a suspected phishing site. In some implementations, at 204, the site is not analyzed at a different compute device (e.g., SaaS compute device 120 and/or security compute device 140) and/or not by a different application at the first compute device. At 206, for each request to a software as a service (SaaS) application at a second compute device via the browser, a user-agent header associated with that request is updated to include the identifier. In some implementations, the user-agent header associated with that request is modified to include the identifier and the user-agent header is not further modified before being sent at 208. At 208, the user-agent header is sent to the second compute device (e.g., SaaS compute device 120) to cause a third compute device (e.g., security compute device 140) to (1) receive the identifier from the second compute device, (2) receive an audit log indicating a set of activities performed at the SaaS application, and (3) identify a subset of activities from the set of activities, where the subset of activities are performed via the browser using the Identifier. In some implementations, the third compute device does not receive the entire user-agent header itself.

In some implementations of method 200, the analyzing the site at 204 includes identifying an element at the site (e.g., a code portion/feature/predefined data of the site) that should only be included in predetermined set of sites. In some implementations of method 200, the analyzing the site at 204 further includes determining that the site is the phishing site and/or the suspected phishing site in response to the identifying and the site not being included in the predetermined set of sites. In some implementations of method 200, the analyzing the site at 204 further includes determining that the site is not the phishing site and/or the suspected phishing site in response to the identifying and the site being included in the predetermined set of sites.

In some implementations of method 200, the analyzing the site at 204 includes determining whether the site includes any image from a plurality of images of a plurality of predetermined login pages. In some implementations of method 200, the analyzing the site at 204 further includes determining that the site is the phishing site and/or the suspected phishing site in response to determining that the site does not include any image from the plurality of images. In some implementations of method 200, the analyzing the site at 204 further includes determining that the site is not the phishing site and/or the suspected phishing site in response to determining that the site does include an image from the plurality of images.

In some implementations of method 200, the analyzing the site at 204 includes hashing at least one of an (hypertext markup language) HTML document portion associated with the site, a document object model (DOM) associated with the site, or a resource loaded on the site, to generate a hash. In some implementations of method 200, the analyzing the site at 204 further includes comparing the hash to a predetermined set of hashes associated with blacklisted sites. In some implementations of method 200, the analyzing the site at 204 further includes, in response to the hash being substantially similar (e.g., within a predetermined threshold, at least 90% match, at least 95% match, 100% match) to a hash from the predetermined set of hashes associated with blacklisted sites, identifying the site as the phishing site and/or the suspected phishing site.

In some implementations of method 200, the analyzing the site at 204 includes hashing at least one of an HTML document portion associated with the site, a document object model (DOM) associated with the site, or a resource loaded on the site, to generate a hash. In some implementations of method 200, the analyzing the site at 204 further includes comparing the hash to a predetermined set of hashes associated with whitelisted sites. In some implementations of method 200, the analyzing the site at 204 further includes, in response to the hash being substantially similar to a hash from the predetermined set of hashes associated with whitelisted sites, identifying a domain associated with the site. In some implementations of method 200, the analyzing the site at 204 further includes, in response to the domain not being included in a predetermined set of domains, identifying the site as the phishing site and/or suspected phishing site. In some implementations of method 200, the analyzing the site at 204 further includes, in response to the domain being included in a predetermined set of domains, identifying the site as not the phishing site and/or the suspected phishing site.

In some implementations of method 200, the browser is configured to allow a user to log into the browser based on a user profile. In some implementations, method 200 further includes identifying, in response to installing the browser extension, an identity of the user based on the user profile.

Some implementations of method 200 further include analyzing, in response to installing the browser extension, the SaaS application for an email address associated with at least one of a local storage, a session storage, or a cookie, to determine an identity of the user.

Some implementations of method 200 further include analyzing, in response to installing the browser extension, a browser history of the browser for a title that includes an email address associated with the user, to determine an identity of the user.

FIG. 3 shows a flowchart of a method 300 to perform attestation, according to an embodiment. In some implementations, method 300 is performed by a processor (e.g., processor 102).

At 302, a browser extension (e.g., browser extension 108) for a browser (e.g., browser 106) is installed at an apparatus (e.g., user compute device 100). In some implementations, the browser extension is installed at the apparatus and not other devices (e.g., not installed at SaaS compute device 120, not installed at security compute device 140, not installed at a compute device not shown in FIG. 1, and/or the like). At 304, a private key of a keypair is stored (e.g., at memory 104). In some implementations, the private key is stored at the apparatus and not other devices (e.g., not installed at SaaS compute device 120, not installed at security compute device 140, not installed at a compute device not shown in FIG. 1, and/or the like). At 306, in response to a request to a software as a service (SaaS) application (e.g., to SaaS compute device 120), (1) an identifier that uniquely identifies the apparatus (e.g., and not other apparatuses) is caused, via the browser extension, to be hashed using the private key to generate a hashed identifier, and (2) the hashed identifier is sent to a compute device (e.g., security compute device 140) to cause the compute device to use a public key of the keypair to obtain the identifier and determine whether the SaaS application is a phishing site and/or a suspected phishing site based on the identifier.

In some implementations of method 300, the private key is stored in at least one of a Trusted Platform Module (TPM) or a Secure Enclave. In some implementations, the TPM and/or Secure Enclave is included in the apparatus. In some implementations of method 300, the private key is stored in a dedicated special hardware device. In some implementations, the dedicated special hardware device is included in the apparatus. In some implementations of method 300, the identifier is a serial number associated with the apparatus.

In some implementations of method 300, the private key and the public key are generated at the compute device. Some implementations of method 300 further include receiving the private key from the compute device before storing the private key.

FIG. 4 shows a flowchart of a method 400 to perform attestation, according to an embodiment. In some implementations, method 400 is performed by a processor (e.g., processor 102).

At 402, a browser extension (e.g., browser extension 108) for a browser (e.g., browser 106) is installed at a first compute device (e.g., user compute device 100). In some implementations, the browser extension is installed at the first compute device and not other devices (e.g., not installed at SaaS compute device 120, not installed at security compute device 140, not installed at a compute device not shown in FIG. 1, and/or the like). At 404, a first log indicating activities tracked by the browser extension as being performed at a software as a service (SaaS) application via the browser and by the user is generated. In some implementations, the first log does not indicate activities performed at a different SaaS application and/or tracked via a different browser extension. At 406, a representation of the first log is sent to a second compute device (e.g., security compute device 140) to cause the second compute device to perform cyber attestation by comparing (1) the first log and (2) a second log (a) sent to the second compute device via a third compute device (e.g., SaaS compute device 120) associated with the SaaS application and (b) representing activities determined by the third compute device as being performed at the SaaS application via the browser and by the user. In some implementations, cyber attestation is successfully performed (e.g., the first compute device is attested) if the first log matches the second log, and cyber attestation is not successfully performed (e.g., the first compute is not attested) if the first log does not match the second log. In some implementations, the comparing at 406 results in a binary determination of either (1) the first log and the second log match or (2) the first log and the second log do not match.

Some implementations of method 400 further include storing a private key of a keypair. Some implementations of method 400 further include, in response to a request to the SaaS application, causing, via the browser extension, an identifier to be hashed using the private key to generate a hashed identifier. Some implementations of method 400 further include, in response to a request to the SaaS application, sending the hashed identifier to the second compute device to cause the second compute device to use a public key of the keypair to obtain the identifier and determine whether the SaaS application is a phishing site and/or a suspected phishing site based on the identifier.

Some implementations of method 400 further include determining, in response to the SaaS application not having predefined data identifiably associated with at least one SaaS application from a predetermined set of SaaS applications, that the SaaS application is at least one of a phishing site or a suspected phishing sites. Some implementations of method 600 further include determining, in response to the SaaS application having predefined data identifiably associated with at least one SaaS application from the predetermined set of SaaS applications, that the SaaS application is not the at least one of the phishing site or the suspected phishing site.

Some implementations of method 400 further include determining whether the SaaS application includes any image from a plurality of images of a plurality of predetermined login pages. Some implementations of method 400 further include determining that the SaaS application is a phishing site and/or a suspected phishing site in response to determining that the SaaS application does not include any image from the plurality of images. Some implementations of method 400 further include determining that the SaaS application is not the phishing site and/or the suspected phishing site in response to determining that the SaaS application does include an image from the plurality of images.

Some implementations of method 400 further include hashing at least one of an (hypertext markup language) HTML document portion associated with the SaaS application, a document object model (DOM) associated with the SaaS application, or a resource loaded on the SaaS application, to generate a hash. Some implementations of method 400 further include comparing the hash to a predetermined set of hashes associated with blacklisted sites. Some implementations of method 400 further include, in response to the hash being substantially similar to a hash from the predetermined set of hashes associated with blacklisted sites, identifying the SaaS application as a phishing site and/or a suspected phishing site.

Some implementations of method 400 further include hashing at least one of an HTML document portion associated with the SaaS application, a document object model (DOM) associated with the SaaS application, or a resource loaded on the SaaS application, to generate a hash. Some implementations of method 400 further include comparing the hash to a predetermined set of hashes associated with whitelisted sites. Some implementations of method 400 further include, in response to the hash being substantially similar to a hash from the predetermined set of hashes associated with whitelisted sites, identifying a domain associated with the SaaS application. Some implementations of method 400 further include, in response to the domain not being included in a predetermined set of domains, identifying the SaaS application as a phishing site and/or a suspected phishing site. Some implementations of method 400 further include, in response to the domain being included in a predetermined set of domains, identify the SaaS application as not the phishing site and/or the suspected phishing site.

Some implementations of method 400 further include receiving an indication from the second compute device that the first log and the second log are substantially different (e.g., at least 5% different, at least 10% different, at least 25% different, at least 50% different, and/or the like). Some implementations of method 400 further include leaving the SaaS application in response to receiving the indication.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the Figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure. As used herein, unless indicated otherwise, the term "substantially" indicates one or more of at least 50% similar, at least 75% similar, at least 90% similar, at least 95% similar, or at least 99% similar.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
   installing, via a processor of a first compute device associated with a user, a browser extension for a browser at the first compute device, the browser extension associated with an identifier that uniquely identifies a combination of the browser and at least one of the first compute device or the user;
   for each site visited via the browser, analyzing, via the processor, a respective site via the browser extension to determine whether the respective site is at least one of a phishing site or a suspected phishing site; and
   for each request to a software as a service (SaaS) application at a second compute device via the browser,
      updating, via the processor, a user-agent header associated with that request to include the identifier, and
      sending, via the processor, the user-agent header to the second compute device to cause a third compute device to (1) receive the identifier from the second compute device, (2) receive an audit log indicating a set of activities performed at the SaaS application, (3) identify a subset of activities that is from the set of activities and that is performed via the browser using the identifier, (4) determine based on the subset of activities that the SaaS application is the at least one of the phishing site or the suspected phishing site, and (5) perform a remedial action in response to determining that the SaaS application is the at least one of the phishing site or the suspected phishing site.

2. The method of claim 1, wherein, for each site visited via the browser, the analyzing the respective site includes:
   identifying an element at the respective site that should only be included in a predetermined set of sites;
   determining that the respective site is the at least one of the phishing site or the suspected phishing site in response to the identifying and the respective site not being included in the predetermined set of sites; and
   determining that the respective site is not the at least one of the phishing site or the suspected phishing site in response to the identifying and the respective site being included in the predetermined set of sites.

3. The method of claim 1, wherein, for each site visited via the browser, the analyzing the site includes:
   determining whether the respective site includes any image from a plurality of images of a plurality of predetermined login pages;
   determining that the respective site is the at least one of the phishing site or the suspected phishing site in response to determining that the respective site does not include any image from the plurality of images; and
   determining that the respective site is not the at least one of the phishing site or the suspected phishing site in response to determining that the respective site does include an image from the plurality of images.

4. The method of claim 1, wherein, for each site visited via the browser, the analyzing the site includes:

hashing at least one of a hypertext markup language (HTML) document portion associated with the respective site, a document object model (DOM) associated with the respective site, or a resource loaded on the respective site, to generate a hash;

comparing the hash to a predetermined set of hashes associated with blacklisted sites; and in response to the hash being substantially similar to a hash from the predetermined set of hashes associated with blacklisted sites, identifying the respective site as the at least one of the phishing site or the suspected phishing site.

5. The method of claim 1, wherein, for each site visited via the browser, the analyzing the site includes:

hashing at least one of a hypertext markup language (HTML) document portion associated with the respective site, a document object model (DOM) associated with the respective site, or a resource loaded on the respective site, to generate a hash;

comparing the hash to a predetermined set of hashes associated with whitelisted sites;

in response to the hash being substantially similar to a hash from the predetermined set of hashes associated with whitelisted sites, identifying a domain associated with the respective site;

in response to the domain not being included in a predetermined set of domains, identifying the respective site as the at least one of the phishing site or the suspected phishing site; and in response to the domain being included in a predetermined set of domains, identifying the respective site as not the at least one of the phishing site or the suspected phishing site.

6. The method of claim 1, wherein the browser is configured to allow the user to log into the browser based on a user profile, the method further comprising:

identifying, in response to installing the browser extension, an identity of the user based on the user profile.

7. The method of claim 1, further comprising:

analyzing, in response to installing the browser extension, the SaaS application for an email address associated with at least one of a local storage, a session storage, or a cookie, to determine at least one of an identity of the user or the first compute device.

8. The method of claim 1, further comprising:

analyzing, in response to installing the browser extension, a browser history of the browser for a title that includes an email address associated with the user, to determine an identity of the user.

9. A first compute device associated with a user, comprising:

a memory; and a processor operatively coupled to the memory, the processor configured to:

install a browser extension for a browser at the first compute device, the browser extension associated with an identifier that uniquely identifies a combination of the browser and at least one of the first compute device or the user;

for each site visited via the browser, analyzing a respective site via the browser extension to determine whether the respective site is at least one of a phishing site or a suspected phishing site; and for each request to a software as a service (SaaS) application at a second compute device via the browser, update a header associated with that request to include the identifier, and send the header to the second compute device to cause a third compute device to (1) receive the identifier from the second compute device, (2) receive an audit log indicating a set of activities performed at the SaaS application, (3) identify a subset of activities that is from the set of activities and that is performed via the browser using the identifier, (4) determine based on the subset of activities that the SaaS application is the at least one of the phishing site or the suspected phishing site, and (5) perform a remedial action in response to determining that the SaaS application is the at least one of the phishing site or the suspected phishing site.

10. The first compute device of claim 9, wherein, for each site visited via the browser, the analyzing the respective site includes:

identifying an element at the respective site that should only be included in a predetermined set of sites;

determining that the respective site is the at least one of the phishing site or the suspected phishing site in response to the identifying and the respective site not being included in the predetermined set of sites; and determining that the respective site is not the at least one of the phishing site or the suspected phishing site in response to the identifying and the respective site being included in the predetermined set of sites.

11. The first compute device of claim 9, wherein, for each site visited via the browser, the analyzing the respective site includes:

determining whether the respective site includes any image from a plurality of images of a plurality of predetermined login pages;

determining that the respective site is the at least one of the phishing site or the suspected phishing site in response to determining that the respective site does not include any image from the plurality of images; and determining that the respective site is not the at least one of the phishing site or the suspected phishing site in response to determining that the respective site does include an image from the plurality of images.

12. The first compute device of claim 9, wherein, for each site visited via the browser, the analyzing the respective site includes:

hashing at least one of a hypertext markup language (HTML) document portion associated with the respective site, a document object model (DOM) associated with the respective site, or a resource loaded on the respective site, to generate a hash;

comparing the hash to a predetermined set of hashes associated with blacklisted sites; and in response to the hash being substantially similar to a hash from the predetermined set of hashes associated with blacklisted sites, identifying the respective site as the at least one of the phishing site or the suspected phishing site.

13. The first compute device of claim 9, wherein, for each site visited via the browser, the analyzing the respective site includes:

hashing at least one of a hypertext markup language (HTML) document portion associated with the respective site, a document object model (DOM) associated with the respective site, or a resource loaded on the respective site, to generate a hash;

comparing the hash to a predetermined set of hashes associated with whitelisted sites;

in response to the hash being substantially similar to a hash from the predetermined set of hashes associated with whitelisted sites, identifying a domain associated with the respective site;

in response to the domain not being included in a predetermined set of domains, identifying the respective site as the at least one of the phishing site or the suspected phishing site; and in response to the domain being included in a predetermined set of domains, identifying the respective site as not the at least one of the phishing site or the suspected phishing site.

14. The method of claim 1, further comprising:

generating a first log indicating activities tracked by the browser extension as being performed at the SaaS application via the browser and by the user; and sending a representation of the first log to the third compute device to cause the third compute device to perform cyber attestation by comparing (1) the first log and (2) a second log (a) sent to the third compute device via the second compute device associated with the SaaS application and (b) representing activities determined by the second compute device as being performed at the SaaS application via the browser and by the user.

15. The method of claim 1, further comprising:

storing a private key of a keypair; and in response to a request to the SaaS application, causing, via the browser extension, the identifier to be hashed using the private key to generate a hashed identifier, and sending the hashed identifier to the third compute device to cause the third compute device to use a public key of the keypair to obtain the identifier, the determining that the SaaS application is the at least one of the phishing site or the suspected phishing site based on the identifier.

16. The method of claim 1, wherein:

determining that the SaaS application is the at least one of the phishing site or the suspected phishing site is further based on the SaaS application not having predefined data identifiably associated with at least one SaaS application from a predetermined set of SaaS applications.

17. The method of claim 1, further comprising:

determining whether the SaaS application includes any image from a plurality of images of a plurality of predetermined login pages, the determining that the SaaS application is the at least one of the phishing site or the suspected phishing site further based on determining that the SaaS application does not include any image from the plurality of images.

18. The method of claim 1, further comprising:

hashing at least one of a hypertext markup language (HTML) document portion associated with the SaaS application, a document object model (DOM) associated with the SaaS application, or a resource loaded on the SaaS application, to generate a hash; and comparing the hash to a predetermined set of hashes associated with blacklisted sites, the determining the SaaS application as the at least one of the phishing site or the suspected phishing site further based on the hash being substantially similar to a hash from the predetermined set of hashes associated with blacklisted sites.

19. The method of claim 1, further comprising:

hashing at least one of a hypertext markup language (HTML) document portion associated with the SaaS application, a document object model (DOM) associated with the SaaS application, or a resource loaded on the SaaS application, to generate a hash;

comparing the hash to a predetermined set of hashes associated with whitelisted sites; and in response to the hash being substantially similar to a hash from the predetermined set of hashes associated with whitelisted sites, identifying a domain associated with the SaaS application, the determining the SaaS application as the at least one of the phishing site or the suspected phishing site further based on the domain not being included in a predetermined set of domains.

20. The method of claim 14, further comprising:

receiving an indication from the third compute device that the first log and the second log are substantially different; and leaving the SaaS application in response to receiving the indication.

* * * * *